United States Patent
Aouak et al.

(10) Patent No.: US 12,420,242 B1
(45) Date of Patent: Sep. 23, 2025

(54) SELECTIVE EXTRACTION OF THIOPHENE FROM THIOPHENE/N-HEPTANE USING A POLY(VINYL ACETATE)/WATER MEMBRANE SYSTEM

(71) Applicant: KING SAUD UNIVERSITY, Riyadh (SA)

(72) Inventors: Taieb Aouak, Riyadh (SA); Ahmed Yacine Badjah Hadj Ahmed, Riyadh (SA); Wafa Nazal Alharbi, Riyadh (SA); Zeid Abdullah Alothman, Riyadh (SA); Abderahmane Abdullah Alwarthan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/256,934

(22) Filed: Jul. 1, 2025

(51) Int. Cl.
*B01D 71/38* (2006.01)
*B01D 61/36* (2006.01)

(52) U.S. Cl.
CPC ...... *B01D 71/383* (2022.08); *B01D 2257/306* (2013.01); *B01D 2311/14* (2013.01); *B01D 2313/041* (2022.08); *B01D 2313/08* (2013.01); *B01D 2313/18* (2013.01); *B01D 2313/243* (2013.01); *B01D 2313/501* (2022.08)

(58) Field of Classification Search
CPC ............ B01D 71/383; B01D 2257/306; B01D 2311/14; B01D 2313/041; B01D 2313/08; B01D 2313/18; B01D 2313/243; B01D 2313/501
See application file for complete search history.

(56) References Cited

U.S. PATENT DOCUMENTS

| 4,755,299 | A | 7/1988 | Bruschke |
| 5,156,740 | A | 10/1992 | Brüschke |
| 5,611,930 | A | 3/1997 | Nguyen et al. |
| 9,873,091 | B2 | 1/2018 | Frania et al. |

FOREIGN PATENT DOCUMENTS

| CN | 108786488 | 11/2018 |
| JP | H9-239248 | 9/1997 |

OTHER PUBLICATIONS

Sun et al., "Preparation and pervaporation performance of partly hydrolyzed poly(vinyl acetate) membranes for separating benzene/cyclohexane mixtures," Journal of Chemical Engineering of Chinese Universities, 19(6): 843-846, Dec. 2005.

*Primary Examiner* — Pranav N Patel
(74) *Attorney, Agent, or Firm* — Nath, Goldberg & Meyer; Joshua B. Goldberg (57) ABSTRACT

A method of using a system includes injecting a liquid mixture from a reservoir to an upper cell; stirring the liquid mixture in the upper cell using a stirrer; separating a first organic constituent from the liquid mixture by absorbing the first organic constituent of the liquid mixture at a first peripheral section of a membrane thereby causing a retentate comprising a second organic constituent and a solvent to reside in the upper cell; desorbing the first organic constituent of the liquid mixture at a second peripheral section of the membrane to obtain a first organic constituent permeate vapor; receiving the first organic constituent permeate vapor in a third feed line of a lower cell; receiving the retentate in a second feed line of the upper cell; and sending the retentate to the reservoir via the second feed line.

16 Claims, 3 Drawing Sheets

SELECTIVE EXTRACTION OF THIOPHENE FROM THIOPHENE/N-HEPTANE USING A POLY(VINYL ACETATE)/WATER MEMBRANE SYSTEM

FIELD AND BACKGROUND

The disclosure of the present application relates to a system, and particularly to a system and a method of using the system for separating a first organic constituent from a liquid mixture comprising the first organic constituent, a second organic constituent, and a solvent.

DESCRIPTION OF RELATED ART

The production of desulfurized fuels has attracted the attention of many researchers and institutions all around the world due to new global regularizations requiring drastic reduction of sulfur in fuel. According to European and American legislation, the upper limit for sulfur content in diesel fuel is set at 10 ppm for the EU and 15.10-6 ppm for the USA.

Currently, one of the most effective ways for desulfurizing fuels is a hydrotreatment process. However, this process suffers from high investment requirements and operating costs. In addition, alkenes and cyclic alkanes are likely to be hydrogenated during hydrotreatment leading to a significant reduction in fuel octane number since alkenes and cycloalkanes have higher octane numbers than do paraffins.

In light of the above, a need remains for a system and a method of using the system for separating a first organic constituent from a liquid mixture for solving the aforementioned problems.

SUMMARY

The present subject matter relates generally to a system, and particularly to a system and a method of using the system for separating a first organic constituent from a liquid mixture comprising the first organic constituent, a second organic constituent, and a solvent. In particular, the present subject matter relates to a system and method of using the system to separate one or more sulfur-containing component(s) from liquid fuel, such as separating thiophene from a liquid fuel containing thiophene and n-heptane.

In this regard, in one embodiment, the present subject matter relates to a system which, in one embodiment, includes a reservoir configured to contain a liquid mixture comprising a first organic constituent, a second organic constituent, and a solvent; a first feed line and a second feed line in communication with the reservoir; and a separation cell comprising: an upper cell, a membrane support frame, and a lower cell, with the membrane support frame located between the upper cell and the lower cell, the upper cell comprises a stirrer, the upper cell in communication with the first feed line and the second feed line, wherein the upper cell is configured to receive the liquid mixture via the first feed line, the stirrer is configured to stir the liquid mixture, and the second feed line is configured to receive a retentate comprising the second organic constituent and the solvent in the upper cell and send the retentate to the reservoir; the membrane support frame comprises a gasket configured to receive a membrane therein and provide a hermetic seal between the upper cell and the lower cell; wherein the membrane is configured to: absorb the first organic constituent of the liquid mixture received in the upper cell via the first feed line at a first peripheral section of the membrane thereby causing the retentate to reside in the upper cell and desorb the first organic constituent of the liquid mixture at a second peripheral section of the membrane to obtain a first organic constituent permeate vapor; and the lower cell in communication with a third feed line configured to receive the first organic constituent permeate vapor.

In an embodiment, the first organic constituent, the second organic constituent, and the solvent can include thiophene, heptane, and water, respectively.

In another embodiment, the stirrer can include a motor, an extension rod, and a stirrer bar, wherein the extension rod can be attached and located between the motor and the stirrer bar.

In an additional embodiment, the upper cell can further include a concentric wall surrounding exterior sides of the upper cell.

In a supplementary embodiment, the upper cell can further include a first portion, a second portion, a third portion, and a fourth portion, with the second portion and the third portion located sequentially between the first portion and the fourth portion; wherein the motor, located at the first portion of the upper cell, can be configured to provide rotation to the stirrer bar via the extension rod; a liquid inlet and a liquid outlet located at the third portion and the second portion, respectively, of the concentric wall, wherein the concentric wall can be configured to receive a liquid via the liquid inlet to maintain the upper cell at a predetermined temperature; and a bottom end of the upper cell, located at the fourth portion of the upper cell, which can be configured to contact the gasket.

In a further embodiment, the gasket can include polytetrafluoroethylene.

In an embodiment, the membrane can include polyvinyl acetate and water.

In another embodiment, the system can further include a vacuum pump, indirectly in communication with the third feed line, which can be configured to provide a vacuum suction to the lower cell thereby facilitating the absorption and desorption of the first organic constituent at the first peripheral section and the second peripheral section, respectively, of the membrane.

In an additional embodiment, the system can further include a first three-way valve, in communication with the third feed line, which can be configured to receive the first organic constituent permeate vapor from the third feed line; a fourth inlet feed line, in communication with the first three-way valve, which can be configured to receive a portion of the first organic constituent permeate vapor; a first cold trap tank, in communication with the fourth inlet feed line, which can be configured to condense the portion of the first organic constituent permeate vapor received from the fourth inlet feed line to obtain a first condensate; a fifth outlet feed line in communication with the first cold trap tank; and a second three-way valve, in communication with the fifth outlet feed line, which can be configured to receive the first condensate from the first cold trap tank via the fifth outlet feed line.

In a supplementary embodiment, the system can further include a sixth inlet feed line, in communication with the first three-way valve, which can be configured to receive another portion of the first organic constituent permeate vapor; a second cold trap tank, in communication with the sixth inlet feed line, which can be configured to condense the another portion of the first organic constituent permeate vapor received from the sixth inlet feed line to obtain a second condensate; a seventh outlet feed line in communication with the second cold trap tank; wherein the second three-way valve, in communication with the seventh outlet feed line, can be further configured to receive the second condensate from the second cold trap tank via the seventh outlet feed line; and wherein the first condensate and the second condensate within the second three-way valve can be mixed together to obtain a condensate mixture.

In an embodiment, the system can further include an eighth inlet feed line in communication with the second three-way valve; a pump protection trap tank, in communication with the eighth inlet feed line, which can be configured to receive the condensate mixture; a ninth outlet feed line in communication with the pump protection trap tank; and wherein the vacuum pump, in communication with the ninth outlet feed line, can be configured to receive the condensate mixture from the pump protection trap tank via the ninth outlet feed line.

In another embodiment, the system can further include a third three-way valve located in the fifth outlet feed line between the first cold trap tank and the second three-way valve; a first vacuum line in communication with the third three-way valve; and a Pirani gauge, in communication with the first vacuum line, which can be configured to measure a vacuum pressure within the fifth outlet feed line.

In an additional embodiment, the system can further include a second vacuum line, in communication with the sixth inlet feed line, located between the first three-way valve and the second cold trap tank; a fourth three-way valve in communication with the second vacuum line; a third vacuum line in communication with the fourth three-way valve and the first vacuum line; and wherein the Pirani gauge can be further configured to measure a vacuum pressure within the sixth inlet feed line via the second vacuum line, the third vacuum line, and the first vacuum line.

In a further embodiment, the present subject matter relates to a method of using the above system for separating the first organic constituent from the liquid mixture, wherein the method includes supplying the liquid mixture comprising the first organic constituent, the second organic constituent, and the solvent to the reservoir; injecting the liquid mixture from the reservoir to the upper cell via the first feed line to receive the liquid mixture in the upper cell; stirring the liquid mixture in the upper cell using the stirrer; separating the first organic constituent from the liquid mixture by absorbing the first organic constituent of the liquid mixture at the first peripheral section of the membrane thereby causing the retentate comprising the second organic constituent and the solvent to reside in the upper cell; desorbing the first organic constituent of the liquid mixture at the second peripheral section of the membrane to obtain the first organic constituent permeate vapor; receiving the first organic constituent permeate vapor in the third feed line of the lower cell; receiving the retentate in the second feed line of the upper cell; and sending the retentate to the reservoir via the second feed line.

These and other features of the present subject matter will become readily apparent upon further review of the following specification.

DETAILED DESCRIPTION

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that systems of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Figure 1:
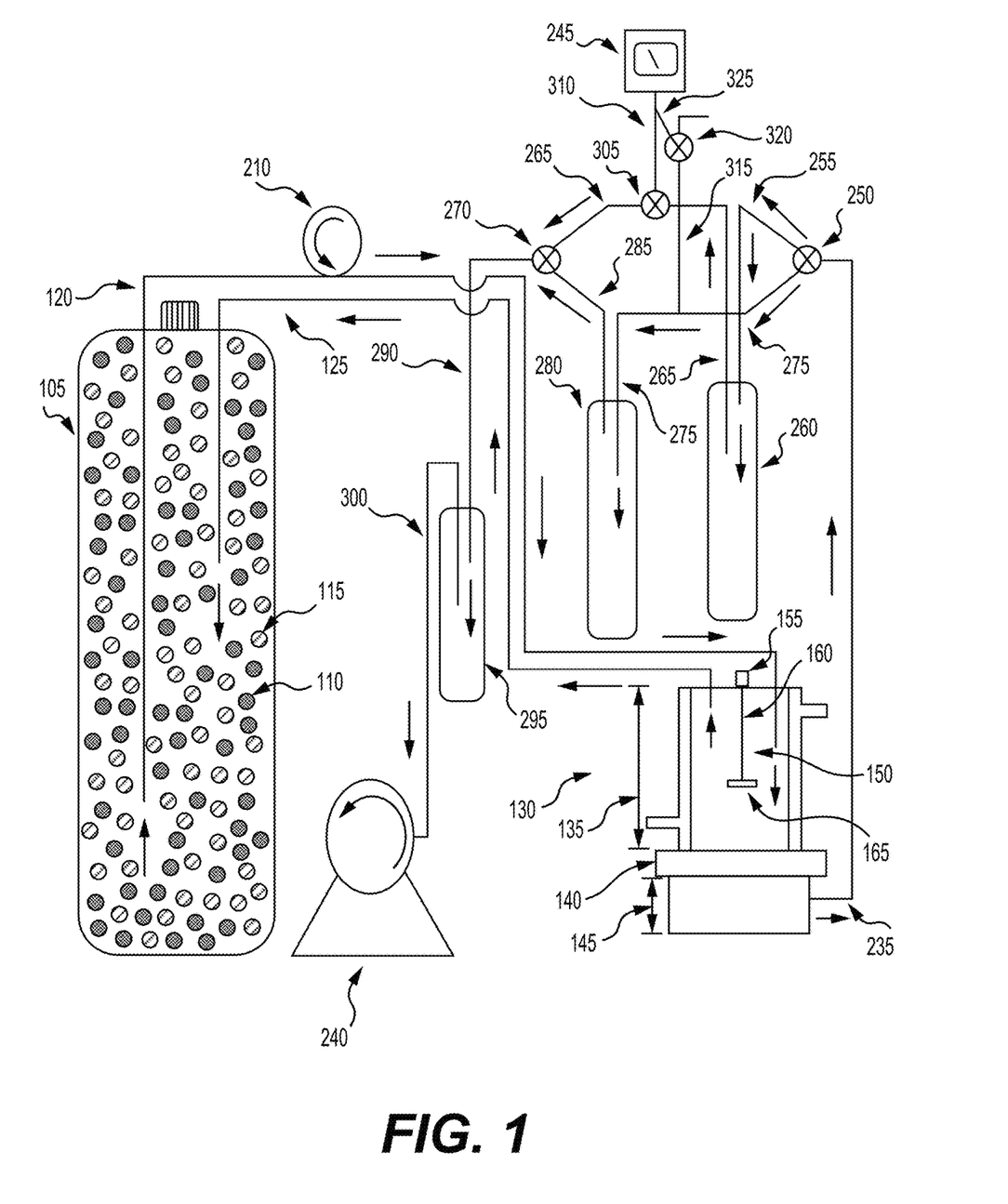
FIG. 1 depicts an overall system.

FIG. 1 depicts, in an embodiment, a system 100 which can include a reservoir 105. The reservoir 105 can be configured to contain a liquid mixture comprising a first organic constituent 110, a second organic constituent 115, and a solvent (not shown). In a non-limiting embodiment, the first organic constituent 110, the second organic constituent 115, and the solvent can include thiophene, heptane, and water, respectively. The heptane and the water can be but are not limited to n-heptane and distilled water, respectively. In an embodiment, the reservoir 105 can be in communication with a first feed line 120 and a second feed line 125.

Figure 2:
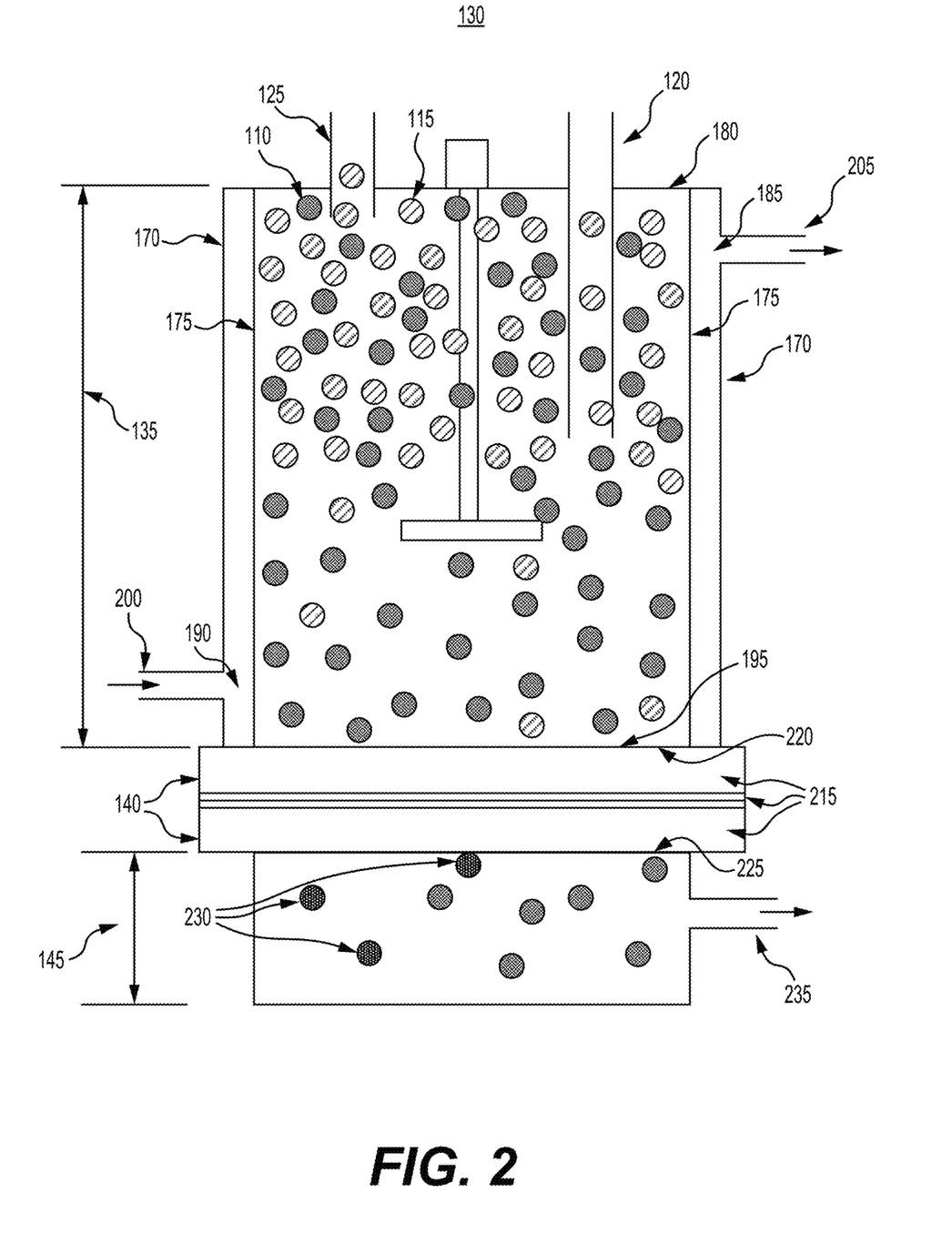
FIG. 2 depicts a separation cell.

The system 100 can also include a separation cell 130 as shown in FIGS. 1-2. The separation cell 130 can include an upper cell 135, a membrane support frame 140, and a lower cell 145, with the membrane support frame 140 located between the upper cell 135 and the lower cell 145.

As shown in FIGS. 1-2, the upper cell 125 can include a stirrer 150. The stirrer 150 can be configured to stir a liquid mixture in the upper cell 135 of the separation cell 130 as described herein. The stirrer 150 can include a motor 155, an extension rod 160, and a stirrer bar 165, wherein the extension rod 160 can be attached and located between the motor 155 and the stirrer bar 165. The stirrer bar 165 can be, by way of non-limiting example, a magnetic stirrer bar.

The upper cell 135 can also include a concentric wall 170 surrounding exterior sides 175 of the upper cell 135 as shown in FIGS. 1-2.

The upper cell 135 can further include a first portion 180, a second portion 185, a third portion 190, and a fourth portion 195, with the second portion 185 and the third portion 190 located sequentially between the first portion 180 and the fourth portion 195 as shown in FIGS. 1-2.

In an embodiment, the motor 155, located at the first portion 180 of the upper cell 135, can be configured to provide rotation to the stirrer bar 165 via the extension rod 160.

In an embodiment, as shown in FIGS. 1-2, a liquid inlet 200 and a liquid outlet 205 can be located at the third portion 190 and the second portion 185 of the upper cell 135, respectively, through the concentric wall 170. The concentric wall 170 can be configured to receive a liquid (not shown) via the liquid inlet 200 to maintain the upper cell 135 at a predetermined temperature. In this regard, the liquid can circulate throughout the concentric wall 170 without contacting any contents of the separation cell 130; rather, the liquid is simply present to maintain the upper portion 135 of the separation cell 130 at a predetermined temperature. In a non-limiting embodiment, the liquid can be a thermostated liquid which can include water. In another non-limiting embodiment, the predetermined temperature can be about 30° C.

In an embodiment, a bottom end of the upper cell 135 can be located at the fourth portion 195 of the upper cell 135.

The upper cell 135 can be in communication with the first feed line 120 and the second feed line 125 as shown in FIGS. 1-2. The first feed line 120 and the second feed line 125 can be connected to the first portion 180 of the upper cell 135. In this regard, the upper cell 135 can be configured to receive the liquid mixture from the reservoir 105 via the first feed line 120. In an embodiment, a peristatic pump 210 can be used to inject and uniformly circulate the liquid mixture from the reservoir 105 to the upper cell 135 as shown in FIGS. 1-2. The second feed line 125, at the first portion 180 of the upper cell 135, can be configured to receive a retentate comprising the second organic constituent 115 and the solvent in the upper cell 135 and send the retentate to the reservoir 105 as described herein.

In an embodiment, the membrane support frame 140 can be a gasket configured to receive a membrane 215 therein as shown in FIG. 2. In a further non-limiting embodiment, the gasket can include polytetrafluoroethylene and can have a circular shape. The gasket can provide a hermetic seal between the upper cell 135 and the lower cell 145. The gasket can be configured to contact the bottom end of the upper cell 135.

In certain non-limiting embodiments, the membrane 215 can include polyvinyl acetate and water. The polyvinyl acetate can by way of non-limiting example be cross-linked polyvinyl acetate. As shown in FIG. 2, the membrane 215 can be configured to absorb the first organic constituent 110 of the liquid mixture at a first peripheral section 220 of the membrane 215 thereby causing the retentate to reside in the upper cell 135. After being absorbed at the first peripheral section 220 of the membrane 215, the first organic constituent 110 can begin to diffuse through the membrane 215 until it reaches a second peripheral section 225 of the membrane 215 where it can desorb to obtain a first organic constituent permeate vapor 230.

In an embodiment, the first organic constituent permeate vapor 230 can be received in the lower cell 145 as shown in FIG. 2. The lower cell 145 can be in communication with a third feed line 235. The third feed line 235 can be configured to receive the first organic constituent permeate vapor 230 within the lower cell 145.

In an embodiment, as shown in FIGS. 1-2, the system 100 can further include a vacuum pump 240 indirectly in communication with the third feed line 235. The vacuum pump 240 can be configured to provide a vacuum suction to the lower cell 145 thereby facilitating the absorption and desorption of the first organic constituent 110 at the first peripheral section 220 and the second peripheral section 225, respectively, of the membrane 215. In a particular non-limiting embodiment, the vacuum pump 240 can be operated at a pressure of about 133 Pa. In an embodiment, the vacuum pump 240 can be used to provide a vacuum environment (i.e., negative pressure below standard atmospheric pressure of about 14.7 psi) to the separation cell 130 prior to the upper cell 135 receiving the liquid mixture from the reservoir 105. To ensure that the vacuum environment is proper, a Pirani gauge 245, as shown in FIG. 1, can be used as described herein. The aforementioned vacuum suction and vacuum environment can also be provided, directly or indirectly, throughout the entire system 100, except for the reservoir 105, as described herein.

In an embodiment, the system 100 can further include a first three-way valve 250 as shown in FIG. 1. The first three-way valve 250 can be in communication with the third feed line 235. The first three-way valve 250 can be configured to receive the first organic constituent permeate vapor 230 from the third feed line 235. The first three-way valve 250 can direct the first organic constituent permeate vapor 230 to respective inlet feed lines and provide reduced pressure to the third feed line 235 as described herein.

In an embodiment, as shown in FIG. 1, the system 100 can further include a fourth inlet feed line 255. The fourth inlet feed line 255 can be in communication with the first three-way valve 250. The fourth inlet feed line 255 can be configured to receive a portion of the first organic constituent permeate vapor 230 from the first three-way valve 250. A first cold trap tank 260 can be communication with the fourth inlet feed line 255 as shown in FIG. 1. The first cold trap tank 260 can be configured to condense the portion of the first organic constituent permeate vapor 230 received from the fourth inlet feed line 255 to obtain a first condensate.

In an embodiment, the system 100 can further include a fifth outlet feed line 265 in communication with the first cold trap tank 260 as shown in FIG. 1. A second three-way valve 270, as shown in FIG. 1, can be in communication with the fifth outlet feed line 265. The second three-way valve 270 can be configured to receive the first condensate from the first cold trap tank 260 via the fifth outlet feed line 265.

In an embodiment, as shown in FIG. 1, the system 100 can further include a sixth inlet feed line 275. The sixth inlet feed line 275 can be in communication with the first three-way valve 250. The sixth inlet feed line 275 can be configured to receive another portion of the first organic constituent permeate vapor 230. A second cold trap tank 280 can be in communication with the sixth inlet feed line 275 as shown in FIG. 1. The second cold trap tank 280 can be configured to condense the another portion of the first organic constituent permeate vapor 230 received from the sixth inlet feed line 275 to obtain a second condensate.

In an embodiment, the system 100 can further include a seventh outlet feed line 285 in communication with the second cold trap tank 280 as shown in FIG. 1. In a further embodiment, the second three-way valve 270 can be in communication with the seventh outlet feed line 285. The second three-way valve 270 can be further configured to receive the second condensate from the second cold trap tank 280 via the seventh outlet feed line 285. The first condensate and the second condensate within the second three-way valve 270 can be mixed together to obtain a condensate mixture.

In an embodiment, as shown in FIG. 1, the system 100 can further include an eighth inlet feed line 290 in communication with the second three-way valve 270. A pump protection trap tank 295 can be in communication with the eighth inlet feed line 290 as shown in FIG. 1. The pump protection trap tank 295 can be configured to receive the condensate mixture from the second three-way valve 270 via the eighth inlet feed line 290. The pump protection trap tank 295 can protect the vacuum pump 240 in the event of destruction to the membrane 215.

In an embodiment, the system 100 can further include a ninth outlet feed line 300 in communication with the pump protection trap tank 295 as shown in FIG. 1. In a further embodiment, the vacuum pump 240 can be in communication with the ninth outlet feed line 300. The vacuum pump 240 can be further configured to receive the condensate mixture from the pump protection trap tank 295 via the ninth outlet feed line 300.

In an embodiment, as depicted in FIG. 1, the system 100 can further include a third three-way valve 305 located in the fifth outlet feed line 265 between the first cold trap tank 260 and the second three-way valve 270. In a further embodiment, a first vacuum line 310 can be in communication with the third three-way valve 305 as shown in FIG. 1. The Pirani gauge 245 can be in communication with the first vacuum line 305. The Pirani gauge 245 can be additionally configured to measure a vacuum pressure within the fifth outlet feed line 265.

In an embodiment, the system 100 can further include a second vacuum line 315 as depicted in FIG. 1. The second vacuum line 315 can be in communication with the sixth inlet feed line 275. The second vacuum line 315 can be located between the first three-way valve 250 and the second cold trap tank 280.

In an embodiment, as depicted in FIG. 1, the system 100 can further include a fourth three-way valve 320 in communication with the second vacuum line 315. In a further embodiment, a third vacuum line 325 can be in communication with the fourth three-way valve 320 and the first vacuum line 310 as shown in FIG. 1. The Pirani gauge 245 can be further configured to measure a vacuum pressure within the sixth inlet feed line 275 via the second vacuum line 315, the third vacuum line 325, and the first vacuum line 310. The measurement of the vacuum pressures within the fifth outlet feed line 265 and the sixth inlet feed line 275 also provide measurement of the vacuum environment as mentioned previously.

Preparation of the Membrane

In an additional embodiment, the present subject matter relates to a method of preparing the membrane 215 prior to a separation process as described herein. The method can begin by preparing a free radical polymerization of vinyl acetate under ultraviolet light in the presence of azobisisobutyronitrile (AIBN) and methyl-diacrylate as an initiator and a crosslinker, respectively. According to this embodiment, about 12.84 g (0.098 mol) of vinyl acetate and about 0.05 g of methyl-diacrylate can be mixed together under stirring with about 0.055 g of azobisisobutyronitrile under ultraviolet light to obtain a reaction mixture 330.

Figure 3:
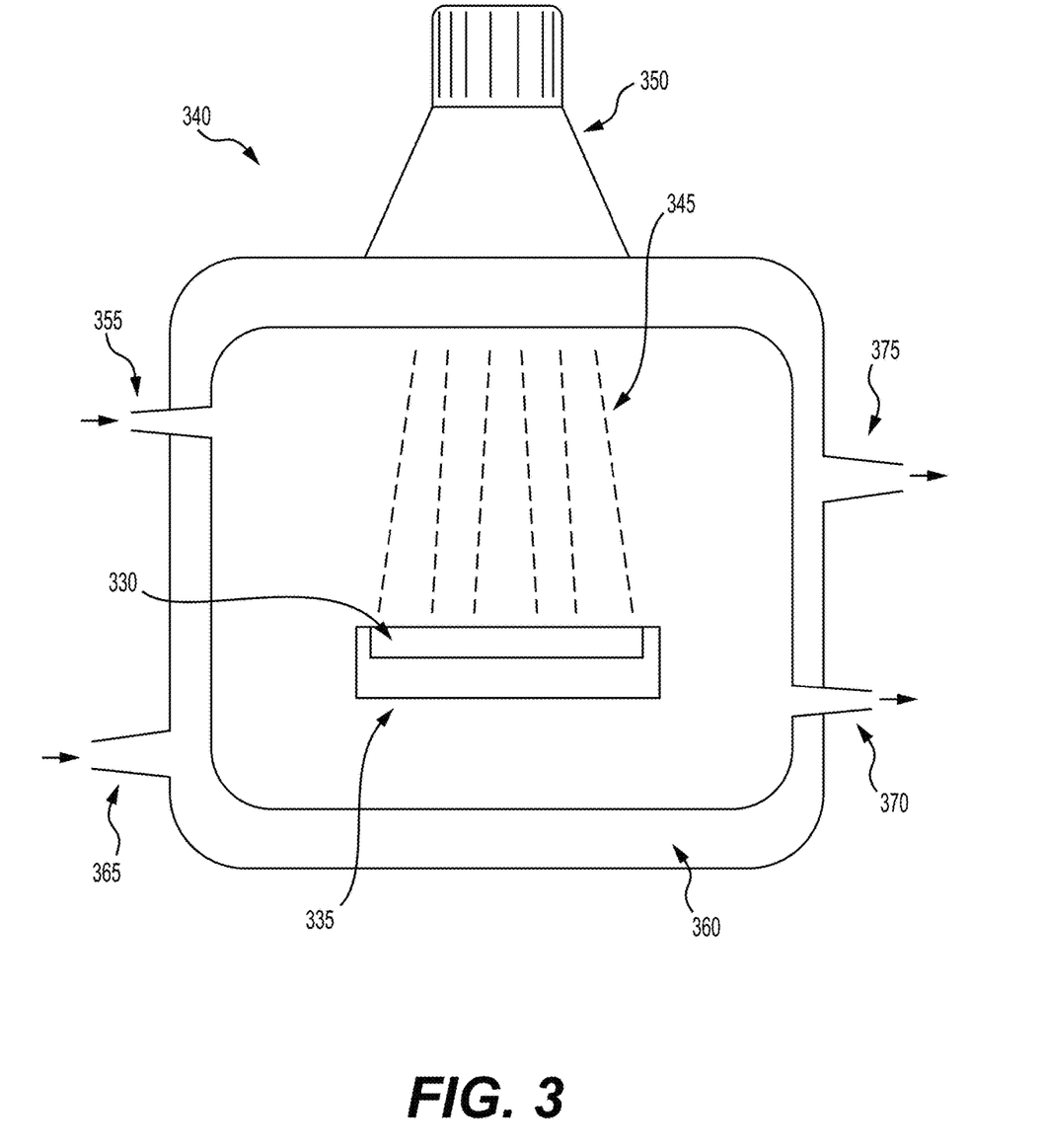
FIG. 3 depicts a method for making a membrane.

Then, the reaction mixture 330 can be transferred to a Teflon® petri dish (mold) 335 and placed inside of a reactor 340 as depicted in FIG. 3.

Next, a polymerization reaction of the reaction mixture 330 within the reactor 340 can occur by exposing the reaction mixture 330 to ultraviolet light 345 using an ultraviolet lamp 350 for about 30 minutes. The ultraviolet light 345 can have a wavelength of about 320 nm and the ultraviolet lamp 350 can produce an output power of about 70 W.

During the polymerization reaction of the reaction mixture 330, nitrogen gas can be injected into the reactor 340 and the reactor 340 can be maintained at a constant temperature. Corresponding to this embodiment, about 3 mL/min of nitrogen gas can be injected inside of the reactor 340 during the polymerization reaction via a nitrogen gas inlet 355 of the reactor 340. Simultaneously or consecutively, water can be circulated through the walls 360 of the reactor 340 to maintain the reactor 340 at a constant temperature of about 30° C. by injecting the water into a water inlet 365 of the reactor 340.

At the end of the polymerization reaction process, a crosslinked polyvinyl acetate material can be obtained. During this stage, the nitrogen gas and water can be removed from the reactor 340. In this aspect, the nitrogen gas within the reactor 340 can be removed by flowing the nitrogen gas through a nitrogen gas outlet 370. Similarly, the circulated water within the walls 360 can be removed from the reactor 340 by flowing the water through a water outlet 375 of the reactor 340.

Afterward, the crosslinked polyvinyl acetate material can be detached from the Teflon® petri dish (mold) 335 after removal from the reactor 340.

Thereafter, the crosslinked polyvinyl acetate material can be air dried for about 12 hours to obtain a dried crosslinked polyvinyl acetate material.

Subsequently, the dried crosslinked polyvinyl acetate material can be placed in a vacuum oven (not shown) to heat at a temperature of about 40° C. at a pressure of about 133 Pa for about 12 hours to obtain a membrane 215 as shown in FIG. 2. The membrane 215 can be a thin, transparent flexible circular membrane. The formed membrane 215 can be used in a separation process as described herein.

Separation Process

In a further embodiment, the present subject matter relates to a method of using the above system 100 for separating (pervaporation method) the first organic constituent 110 from the liquid mixture as shown in FIGS. 1-2. The method can be performed by placing the formed membrane 215 inside of the membrane support frame 140 (Step 1). Then, the membrane support frame 140 can be placed between the upper cell 135 and the lower cell 145 as shown in FIGS. 1-2 (Step 2).

Then, the reservoir 105 can be supplied with the liquid mixture (Step 3). The liquid mixture can include the first organic constituent 110, the second organic constituent 115, and the solvent. In a non-limiting embodiment, the first organic constituent 110, the second organic constituent 115, and the solvent of the liquid mixture, that are in the reservoir 105 and injected into the upper cell 135, can include thiophene, n-heptane, and distilled water, respectively.

Next, a vacuum environment can be provided to the separation cell 130 (Step 4). According to this embodiment, the vacuum pump 240 can be turned on to operate at a pressure of about 133 Pa to provide a vacuum to the separation cell 130 via the third feed line 235, the first three-way valve 250, the fourth inlet feed line 255, the first cold trap tank 260, the fifth outlet feed line 265, the second three-way valve 270, the sixth inlet feed line 275, the second cold trap tank 280, the seventh outlet feed line 285, the eighth inlet feed line 290, the pump protection trap tank 295, and the ninth outlet feed line 300 as shown in FIGS. 1-2. The pressure of the vacuum environment within the separation cell 130 can be measured by the Pirani gauge 245 (Step 5). Once a predetermined pressure has been reached for the vacuum environment within the separation cell 130, an injection step can begin as described herein.

Afterward, the liquid mixture containing thiophene, n-heptane, and distilled water can be injected from the reservoir 105 to the upper cell 135 via the first feed line 120 to receive the liquid mixture in the upper cell 135 as shown in FIGS. 1-2 (Step 6). As another non-limiting embodiment, the thiophene and the n-heptane of the liquid mixture can be injected into the upper cell 135 at about a 50:50 ratio, at about a 30:70 ratio, and at about a 10:90 ratio, respectively, by wt/wt %. In a non-limiting embodiment, about 25 ml of thiophene, about 25 ml of n-heptane, and about 50 mL of distilled water from the reservoir 105 can be injected into the upper cell 135 via the first feed line 120.

During the injection step (see Step 6), the injected liquid mixture within the upper cell 135 can be stirred using the magnetic stirrer bar 165 of the stirrer 150 at a rate of about 250 rpm to about 350 rpm for about 10 minutes (Step 7). Simultaneously, the upper cell 135 can be maintained at about 30° C. by injecting a thermostated liquid (i.e., water) into the liquid inlet 200 of the concentric wall 170 as shown in FIG. 2 (Step 8).

Thereafter, the first organic constituent 110 can be separated from the liquid mixture by absorbing the first organic constituent 110 of the liquid mixture at the first peripheral section 220 of the membrane 215 thereby causing a retentate to reside in the upper cell 135 (Step 9). The retentate can include the second organic constituent 115 (i.e., n-heptane) and the solvent (i.e., distilled water) to reside in the upper cell 135.

The amount of the first organic constituent 110 in the upper cell 135 can gradually deplete during the absorption step thereby lowering the overall volume of the liquid mixture within the upper cell 135. According to this embodiment, the liquid mixture in the reservoir 105 can be injected into the upper cell 135 via the first feed line 120 during the absorption step (Step 10).

After being absorbed at the first peripheral section 220 of the membrane 215, the first organic constituent 110 can begin to diffuse through the membrane 215 until it reaches a second peripheral section 225 of the membrane 215 where it can desorb to obtain a first organic constituent permeate vapor 230 (Step 11) as shown in FIG. 2.

Thereafter, the first organic constituent permeate vapor 230 can be received in the lower cell 145 as shown in FIG. 2 (Step 12).

The lower cell 145 can be in communication with a third feed line 235. The third feed line 235 can be configured to receive the first organic constituent permeate vapor 230 within the lower cell 145 (Step 13).

Subsequently, the first organic constituent permeate vapor 230 can flow from the third feed line 235 through the first three-way valve 250 (Step 14). The first three-way valve 250 can direct a portion of the first organic constituent permeate vapor 230 towards the fourth inlet feed line 255 (Scenario 1) and another portion of the first organic constituent permeate vapor 230 towards the sixth inlet feed line 275 (Scenario 2) as shown in FIG. 1.

According to Scenario 1, the portion of the first organic constituent permeate vapor 230 within the fourth inlet feed line 255 can flow into the first cold trap tank 260 (Step 15). The first cold trap tank 260 can condense the portion of the first organic constituent permeate vapor 230 to obtain a first condensate (Step 16).

Following, the first condensate can flow into the fifth outlet feed line 265 and eventually into the second three-way valve 270 as shown in FIG. 1 (Step 17), Simultaneously or alternately with Scenario 1, Scenario 2 can occur whereby the another portion of the first organic constituent permeate vapor 230 within the sixth inlet feed line 275 can flow into the second cold trap tank 280 (Step 18). The second cold trap tank 280 can condense the another portion of the first organic constituent permeate vapor 230 to obtain a second condensate (Step 19).

Then, the second condensate can flow into the seventh outlet feed line 285 and eventually into the second three-way valve 270 as shown in FIG. 1 (Step 20), The first condensate and the second condensate within the second three-way valve 270 can be mixed together to obtain a condensate mixture (Step 21).

Next, the condensate mixture from the second three-way valve 270 can flow into the pump protection trap tank 295 via the eighth inlet feed line 290 as shown in FIG. 1 (Step 22).

Afterward, the condensate mixture from the pump protection trap tank 295 can flow into the vacuum pump 240 via the ninth outlet feed line 300 as shown in FIG. 1 (Step 22).

At the end of the separation method (pervaporation method), the retentate in the upper cell 135 can flow into the second feed line 125 to be received therein (Step 23). The retentate within the second feed line 125 can be sent to the reservoir 105 (Step 24).

Thereafter, the retentate within the reservoir 105 can be decanted using a separation funnel (not shown) (Step 25).

Results of the Separation Process

When the thiophene and the n-heptane of the liquid mixture injected into the upper cell 135 (see Step 6 above) were at an about 50:50 ratio, at an about 30:70 ratio, and at an about 10:90 ratio, respectively, by wt/wt %, the total flux rates were about 2.54 kg/m$^2$·h$^{-1}$, about 1.93 kg/m$^2$·h$^{-1}$, and about 0.88 kg/m$^2$·h$^{-1}$, respectively.

When the thiophene and the n-heptane of the liquid mixture injected into the upper cell 135 (see Step 6 above) were at an about 50:50 ratio, at an about 30:70 ratio, and at an about 10:90 ratio, respectively, by wt/wt %, the selectivity were about 49.25, about 76.34, and about 184.14, respectively. The selectivity represents the enrichment of the thiophene in the first organic constituent permeate vapor 230.

When the thiophene and the n-heptane of the liquid mixture injected into the upper cell 135 (see Step 6 above) were at an about 50:50 ratio, at an about 30:70 ratio, and at an about 10:90 ratio, respectively, by wt/wt %, the percentage of enrichment of the thiophene in the first organic constituent permeate vapor 230 were about 98.01 wt %, about 97.12 wt %, and about 95.36 wt %, respectively.

Details of the Absorption Step

The role of the water in the separation method is to preferentially dissolve thiophene, which has a much higher aqueous solubility compared to n-heptane as shown in Table 1 below. As long as the n-heptane is practically insoluble in water and its density is lower than those of both thiophene and water, as depicted in Table 1, the lower aqueous phase rich in thiophene can dissolve in the water and can come in direct contact with the polyvinyl acetate/water membrane 215. The reason for this is because the density of thiophene is higher than that of n-heptane which allows for the former to be selectively separated from the latter.

TABLE 1

Some important characteristics of the compounds involved in the separation of thiophene/n-heptane mixtures

| Component | Density (g · cm$^{-3}$) | Solubility parameter, δ (MPa)$^{0.5}$ | Solubility in water (mg · mL$^{-1}$) |
|---|---|---|---|
| thiophene | 1.05 | 20.10 | 3.01 |
| n-heptane | 0.68 | 15.10 | 0.002 |
| water | 1.00 | 47.90 | — |
| polyvinyl acetate | 1.19 | 19.62 | — |

Within separation cell 130, the thiophene and the n-heptane will form an organic phase in the upper portion of the upper cell 135. Conversely, the water will form an aqueous phase in the lower portion of the upper cell 135. Taking into account the solubility of thiophene (3.01 mg/mL) in water which is much higher than that of heptane (0.002 mg/mL) and its density (1.05 g/mL) being very close to that of water (1.0 g/mL), the partition will occur in favor of thiophene. In this situation, the aqueous phase will be relatively richer in thiophene and will form a pseudo feed. The thiophene is mainly found in the aqueous phase at the bottom in direct contact with the membrane.

Given the great affinity of thiophene with the polyvinyl acetate/water membrane 215 (Δδ=0.48 MPa$^{0.5}$) compared to that of thiophene and n-heptane (5.0 MPa$^{0.5}$) and even less between thiophene and water (28.28 MPa$^{0.5}$), thiophene can selectively transit through the polyvinyl acetate/water membrane 215. The transit of the thiophene can be governed by the transfer phenomenon (absorption-diffusion-desorption) at and within the polyvinyl acetate/water membrane 215. In this regard, the first organic constituent permeate vapor 230 collected in the cold trap tanks (260,280) can be richer in thiophene.

It is to be understood that the system and the method of using the system for separating the first organic constituent from the liquid mixture are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A system comprising:

a reservoir configured to contain a liquid mixture comprising a first organic constituent, a second organic constituent, and a solvent;

a first feed line and a second feed line in communication with the reservoir; and a separation cell comprising:

an upper cell, a membrane support frame, and a lower cell, with the membrane support frame located between the upper cell and the lower cell, the upper cell comprises a stirrer, the upper cell in communication with the first feed line and the second feed line, wherein the upper cell is configured to receive the liquid mixture via the first feed line, the stirrer is configured to stir the liquid mixture, and the second feed line is configured to receive a retentate comprising the second organic constituent and the solvent in the upper cell and send the retentate to the reservoir;

the membrane support frame comprises a gasket configured to receive a membrane therein and provide a hermetic seal between the upper cell and the lower cell;

wherein the membrane is configured to:

absorb the first organic constituent of the liquid mixture received in the upper cell via the first feed line at a first peripheral section of the membrane thereby causing the retentate to reside in the upper cell; and desorb the absorbed first organic constituent of the liquid mixture at a second peripheral section of the membrane to obtain a first organic constituent permeate vapor;

and the lower cell in communication with a third feed line configured to receive the first organic constituent permeate vapor; wherein the first organic constituent, the second organic constituent, and the solvent comprise thiophene, heptane, and water, respectively; and wherein the membrane comprises polyvinyl acetate and water.

2. The system of claim 1, wherein the stirrer comprises a motor, an extension rod, and a stirrer bar, wherein the extension rod is attached and located between the motor and the stirrer bar.

3. The system of claim 2, wherein the upper cell further comprises a concentric wall surrounding exterior sides of the upper cell.

4. The system of claim 3, wherein the upper cell further comprises:
a first portion, a second portion, a third portion, and a fourth portion, with the second portion and the third portion located sequentially between the first portion and the fourth portion;
wherein the motor, located at the first portion of the upper cell, is configured to provide rotation to the stirrer bar via the extension rod;
a liquid inlet and a liquid outlet located at the third portion and the second portion, respectively, of the concentric wall, wherein the concentric wall is configured to receive a liquid via the liquid inlet to maintain the upper cell at a predetermined temperature; and
a bottom end of the upper cell, located at the fourth portion of the upper cell, configured to contact the gasket.

5. The system of claim 1, wherein the gasket comprises polytetrafluoroethylene.

6. The system of claim 1, further comprising a vacuum pump, indirectly in communication with the third feed line, configured to provide a vacuum suction to the lower cell thereby facilitating the absorption and desorption of the first organic constituent at the first peripheral section and the second peripheral section, respectively, of the membrane.

7. The system of claim 6, further comprising:
a first three-way valve, in communication with the third feed line, configured to receive the first organic constituent permeate vapor from the third feed line;
a fourth inlet feed line, in communication with the first three-way valve, configured to receive a portion of the first organic constituent permeate vapor;
a first cold trap tank, in communication with the fourth inlet feed line, configured to condense the portion of the first organic constituent permeate vapor received from the fourth inlet feed line to obtain a first condensate;
a fifth outlet feed line in communication with the first cold trap tank; and
a second three-way valve, in communication with the fifth outlet feed line, configured to receive the first condensate from the first cold trap tank via the fifth outlet feed line.

8. The system of claim 7, further comprising:
a sixth inlet feed line, in communication with the first three-way valve, configured to receive another portion of the first organic constituent permeate vapor;
a second cold trap tank, in communication with the sixth inlet feed line, configured to condense the another portion of the first organic constituent permeate vapor received from the sixth inlet feed line to obtain a second condensate;
a seventh outlet feed line in communication with the second cold trap tank;
wherein the second three-way valve, in communication with the seventh outlet feed line, is further configured to receive the second condensate from the second cold trap tank via the seventh outlet feed line; and
wherein the first condensate and the second condensate within the second three-way valve are mixed together to obtain a condensate mixture.

9. The system of claim 8, further comprising:
an eighth inlet feed line in communication with the second three-way valve;
a pump protection trap tank, in communication with the eighth inlet feed line, configured to receive the condensate mixture;
a ninth outlet feed line in communication with the pump protection trap tank; and
wherein the vacuum pump, in communication with the ninth outlet feed line, is configured to receive the condensate mixture from the pump protection trap tank via the ninth outlet feed line.

10. The system of claim 9, further comprising:
a third three-way valve located in the fifth outlet feed line between the first cold trap tank and the second three-way valve;
a first vacuum line in communication with the third three-way valve; and
a Pirani gauge, in communication with the first vacuum line, configured to measure a vacuum pressure within the fifth outlet feed line.

11. The system of claim 10, further comprising:
a second vacuum line, in communication with the sixth inlet feed line, located between the first three-way valve and the second cold trap tank;
a fourth three-way valve in communication with the second vacuum line;
a third vacuum line in communication with the fourth three-way valve and the first vacuum line; and
wherein the Pirani gauge is further configured to measure a vacuum pressure within the sixth inlet feed line via the second vacuum line, the third vacuum line, and the first vacuum line.

12. A method of using the system of claim 1 for separating the first organic constituent from the liquid mixture, the method comprising:
supplying the liquid mixture comprising the first organic constituent, the second organic constituent, and the solvent to the reservoir;
injecting the liquid mixture from the reservoir to the upper cell via the first feed line to receive the liquid mixture in the upper cell;
stirring the liquid mixture in the upper cell using the stirrer;
separating the first organic constituent from the liquid mixture by absorbing the first organic constituent of the liquid mixture at the first peripheral section of the membrane thereby causing the retentate comprising the second organic constituent and the solvent to reside in the upper cell;
desorbing the first organic constituent of the liquid mixture at the second peripheral section of the membrane to obtain the first organic constituent permeate vapor;
receiving the first organic constituent permeate vapor in the third feed line of the lower cell;
receiving the retentate in the second feed line of the upper cell; and
sending the retentate to the reservoir via the second feed line; wherein the first organic constituent, the second organic constituent, and the solvent comprise thiophene, heptane, and water, respectively; and wherein the membrane comprises polyvinyl acetate and water.

13. The method of claim 12, further comprising a vacuum pump, indirectly in communication with the third feed line, configured to provide a vacuum suction to the lower cell thereby facilitating the absorption and desorption of the first organic constituent at the first peripheral section and the second peripheral section, respectively, of the membrane.

14. The method of claim 13, further comprising:
a first three-way valve, in communication with the third feed line, configured to receive the first organic constituent permeate vapor from the third feed line;
a fourth inlet feed line, in communication with the first three-way valve, configured to receive a portion of the first organic constituent permeate vapor;
a first cold trap tank, in communication with the fourth inlet feed line, configured to condense the portion of the first organic constituent permeate vapor received from the fourth inlet feed line to obtain a first condensate;
a fifth outlet feed line in communication with the first cold trap tank; and
a second three-way valve, in communication with the fifth outlet feed line, configured to receive the first condensate from the first cold trap tank via the fifth outlet feed line.

15. The method of claim 14, further comprising:
a sixth inlet feed line, in communication with the first three-way valve, configured to receive another portion of the first organic constituent permeate vapor;
a second cold trap tank, in communication with the sixth inlet feed line, configured to condense the another portion of the first organic constituent permeate vapor received from the sixth inlet feed line to obtain a second condensate;
a seventh outlet feed line in communication with the second cold trap tank;
wherein the second three-way valve, in communication with the seventh outlet feed line, is further configured to receive the second condensate from the second cold trap tank via the seventh outlet feed line; and
wherein the first condensate and the second condensate within the second three-way valve are mixed together to obtain a condensate mixture.

16. The method of claim 15, further comprising:
an eighth inlet feed line in communication with the second three-way valve;
a pump protection trap tank, in communication with the eighth inlet feed line, configured to receive the condensate mixture;
a ninth outlet feed line in communication with the pump protection trap tank; and
wherein the vacuum pump, in communication with the ninth outlet feed line, is configured to receive the condensate mixture from the pump protection trap tank via the ninth outlet feed line.

* * * * *